United States Patent
Lee et al.

(10) Patent No.: US 10,890,811 B2
(45) Date of Patent: Jan. 12, 2021

(54) LIQUID CRYSTAL DISPLAY DEVICE

(71) Applicant: LG Display Co., Ltd., Seoul (KR)

(72) Inventors: Sang-Wook Lee, Paju-si (KR); Hyung-Beom Shin, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/854,308

(22) Filed: Dec. 26, 2017

(65) Prior Publication Data

US 2018/0188569 A1 Jul. 5, 2018

(30) Foreign Application Priority Data

Dec. 30, 2016 (KR) .................. 10-2016-0183501

(51) Int. Cl.
*G02F 1/1343* (2006.01)
*G02F 1/1362* (2006.01)
(Continued)

(52) U.S. Cl.
CPC .......... *G02F 1/1343* (2013.01); *G02F 1/1334* (2013.01); *G02F 1/1393* (2013.01);
(Continued)

(58) Field of Classification Search
CPC ............. G02F 1/1343; G02F 1/133345; G02F 1/133528; G02F 1/136286; G09G 3/18;
(Continued)

(56) References Cited

U.S. PATENT DOCUMENTS 6,075,505 A     6/2000  Shiba et al.
2008/0284708 A1* 11/2008  Oke ..................... G09G 3/3648
                                                  345/96
(Continued)

FOREIGN PATENT DOCUMENTS

CN      101109880 A     1/2008
CN      101540333 A     9/2009
(Continued)

OTHER PUBLICATIONS

First Office Action issued in corresponding Taiwanese Patent Application No. 106144880, dated Nov. 12, 2018.
(Continued)

*Primary Examiner* — Kent W Chang
*Assistant Examiner* — Sujit Shah
(74) *Attorney, Agent, or Firm* — Morgan, Lewis & Bockius LLP

(57) ABSTRACT

An LCD device includes first and second electrodes in each of the first and second pixel regions, a first TFT connected to a second gate line and a first data line and configured to supply a first data voltage to the first electrode in the first pixel region, a second TFT connected to the second gate line and a second data line and configured to supply a second data voltage having a level opposite the first data voltage to the second electrode in the first pixel region, a third TFT connected to a fourth gate line and the first data line and configured to supply the first data voltage to the second electrode in the second pixel region, and a fourth TFT connected to the fourth gate line and the second data line and configured to supply the second data voltage to the first electrode in the second pixel region.

15 Claims, 14 Drawing Sheets

(51) Int. Cl.
*G02F 1/1333* (2006.01)
*G09G 3/18* (2006.01)
*G02F 1/1335* (2006.01)
*G09G 3/36* (2006.01)
*G02F 1/1334* (2006.01)
*G02F 1/139* (2006.01)

(52) U.S. Cl.
CPC .. *G02F 1/133345* (2013.01); *G02F 1/133528* (2013.01); *G02F 1/134363* (2013.01); *G02F 1/136286* (2013.01); *G09G 3/18* (2013.01); *G09G 3/3614* (2013.01); *G09G 3/3659* (2013.01); *G09G 2300/0426* (2013.01); *G09G 2310/0264* (2013.01); *G09G 2320/0247* (2013.01); *G09G 2330/021* (2013.01)

(58) Field of Classification Search
CPC ......... G09G 3/3614; G09G 2300/0426; G09G 2310/0264; G09G 2320/0247; G09G 2330/021
USPC .......................................................... 345/50
See application file for complete search history.

(56) References Cited

U.S. PATENT DOCUMENTS

| | | | |
|---|---|---|---|
| 2009/0135322 A1 | 5/2009 | Kim et al. | |
| 2009/0141010 A1 | 6/2009 | Liao et al. | |
| 2009/0230396 A1* | 9/2009 | Na | G02F 1/13439 |
| | | | 257/59 |
| 2009/0289887 A1* | 11/2009 | Lu | G09G 3/3659 |
| | | | 345/98 |
| 2009/0310047 A1 | 12/2009 | Shin et al. | |
| 2010/0302471 A1* | 12/2010 | Kim | G02F 1/1393 |
| | | | 349/37 |
| 2011/0285950 A1* | 11/2011 | Su | G02F 1/136286 |
| | | | 349/139 |
| 2012/0026136 A1 | 2/2012 | Zhang et al. | |
| 2012/0062807 A1 | 3/2012 | Baek et al. | |
| 2013/0342782 A1* | 12/2013 | Kim | G02F 1/13394 |
| | | | 349/46 |
| 2014/0104301 A1* | 4/2014 | Nakagawa | G09G 3/2003 |
| | | | 345/589 |
| 2014/0375917 A1 | 12/2014 | Kim et al. | |
| 2015/0129877 A1* | 5/2015 | Cho | H01L 27/127 |
| | | | 257/59 |
| 2015/0185487 A1* | 7/2015 | Lee | G02B 3/14 |
| | | | 349/15 |
| 2016/0018709 A1 | 1/2016 | Jeong et al. | |
| 2016/0313590 A1* | 10/2016 | Kang | G02F 1/133528 |

FOREIGN PATENT DOCUMENTS

| | | |
|---|---|---|
| CN | 101900915 A | 12/2010 |
| CN | 103399441 A | 11/2013 |
| CN | 104749833 A | 7/2015 |
| CN | 105278189 A | 1/2016 |
| JP | 2000-330130 A | 11/2000 |
| JP | 2010-277068 A | 12/2010 |
| JP | 2012-063731 A | 3/2012 |
| KR | 10-2016-0044170 A | 4/2016 |
| TW | 374861 B | 11/1999 |
| TW | 200914968 A | 4/2009 |
| WO | 94/08331 A1 | 4/1994 |

OTHER PUBLICATIONS

Office Action issued in corresponding JP Patent Application No. 2017-247820 dated Nov. 8, 2018.
First Notification of Office Action dated Jul. 3, 2020, issued in corresponding Chinese Patent Application No. 201711469832.8.
Examination Report issued in corresponding India Patent Application No. 201714047067 dated Jun. 10, 2020. Note: US20100302471 and US20090230396 cited therein are already of record.

* cited by examiner

SP

| + | − | + | − | + | − | + | − |
|---|---|---|---|---|---|---|---|
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |

Column inversion (D-IC output)

LIQUID CRYSTAL DISPLAY DEVICE

CROSS-REFERENCE TO RELATED APPLICATIONS

This application claims the benefit under 35 U.S.C. § 119(a) of Korean Patent Application No. 10-2016-0183501, filed on Dec. 30, 2016, in the Korean Intellectual Property Office, which is incorporated herein by reference in its entirety.

BACKGROUND

1. Technical Field

The present disclosure relates to a liquid crystal display (LCD) device, and more particularly, to an LCD device in which a flicker phenomenon is effectively improved and including a nanocapsule liquid crystal layer.

2. Discussion of the Related Art

Recently, the display field has been rapidly developed in line with the information age. In response to this, liquid crystal display (LCD) devices, plasma display panel (PDP) devices, electroluminescence display (ELD) devices, field emission display (FED) devices, and the like have been introduced as flat panel display (FPD) devices having advantages in thinness, being lightweight, and low power consumption, and have been spotlighted while rapidly replacing an existing cathode ray tube (CRT).

Among these devices, LCD devices are being most actively used in fields of notebook computers, monitors, TVs, and the like due to excellent moving picture display and a high contrast ratio.

FIG. 1 is a cross-sectional view schematically illustrating a related art LCD device.

As illustrated in FIG. 1, a related art LCD device 100 includes first and second substrates 20 and 40, which face each other and are spaced apart from each other, and a liquid crystal layer 50 which is formed between the first and second substrates 20 and 40.

Specifically, a gate electrode 22 is formed in each of pixel regions P on an inner surface of the first substrate 20, and a gate insulating layer 24 is formed above the gate electrode 22.

A semiconductor layer 26 is formed above the gate insulating layer 24 corresponding to the gate electrode 22, and a source electrode 28 and a drain electrode 30, which are spaced apart from each other, are formed above the semiconductor layer 26.

The gate electrode 22, the semiconductor layer 26, the source electrode 28, and the drain electrode 30 constitute a thin film transistor (TFT) Tr.

A protective layer 32 is formed above the TFT Tr, and a pixel electrode 34 connected to the drain electrode 30 is formed above the protective layer 32.

A first polarizer 36 is formed on an outer surface of the first substrate 20.

A black matrix 42 is formed at a boundary of the pixel region P on an inner surface of the second substrate 40, a color filter layer 44 is formed in the pixel region P under the black matrix 42, and a common electrode 46 is formed under the color filter layer 44.

A second polarizer 48 is formed on an outer surface of the second substrate 40.

The liquid crystal layer 50 including a plurality of liquid crystal molecules 52 is formed between the pixel electrode 34 of the first substrate 20 and the common electrode 46 of the second substrate 40.

In the LCD device 100, when the TFT Tr is turned on according to a gate signal applied to the gate electrode 22, a data signal is applied to the pixel electrode 34 through the TFT Tr and an electric field is generated between the pixel electrode 34 and the common electrode 46.

The plurality of liquid crystal molecules 52 of the liquid crystal layer 50 are rearranged according to the electric field so that the corresponding pixel region P displays a grayscale corresponding to the data signal.

However, the related art LCD device 100 has a disadvantage in that an additional alignment process is required when the two substrates 20 and 40 are separately manufactured and are then bonded to each other.

Alignment layer printing and rubbing processes are required for aligning liquid crystals, and thus a yield is lowered due to such a liquid crystal alignment process.

It is necessary to always constantly maintain a gap between the two substrates 20 and 40 after the two substrates 20 and 40 are bonded to each other and liquid crystals are injected. However, when the gap between the two substrates 20 and 40 is changed by external pressure or impact, display quality is degraded.

In addition, because positive polarity (+) and negative polarity (−) of a data voltage is repeatedly supplied from a data line on the basis of a constant common voltage supplied from a common line so that only half of the data voltage can be used as a driving voltage, the driving voltage is low.

SUMMARY

Accordingly, embodiments of the present disclosure are directed to a liquid crystal display device that substantially obviates one or more of the problems due to limitations and disadvantages of the related art.

An aspect of the present disclosure is to provide a liquid crystal display (LCD) device in which a driving voltage is effectively improved, a flicker phenomenon is improved, and power consumption is reduced.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, an LCD device comprises first to fourth gate lines sequentially spaced apart from each other in parallel, first and second data lines configured to intersect the first to fourth gate lines and define a first pixel region and a second pixel region, a first electrode and a second electrode included in each of the first pixel region and the second pixel region, a first TFT connected to the second gate line and the first data line and configured to supply a first data voltage to the first electrode in the first pixel region, a second TFT connected to the second gate line and the second data line and configured to supply a second data voltage having a level opposite the first data voltage to the second electrode in the first pixel region, a third TFT connected to the fourth gate line and the first data line and configured to supply the first data voltage to the second electrode in the second pixel region, and a fourth TFT connected to the fourth gate line and the second data line and configured to supply the second data voltage to the first electrode in the second pixel region.

The LCD device may further include a third data line configured to intersect the first to fourth gate lines and define a third pixel region and a fourth pixel region, a first electrode and a second electrode included in each of the third pixel region and the fourth pixel region, a fifth TFT connected to the first gate line and the second data line and configured to supply the second data voltage to the first electrode in the third pixel region, a sixth TFT connected to the first gate line and the third data line and configured to supply a third data voltage having a level opposite the second data voltage to the second electrode in the third pixel region, a seventh TFT connected to the third gate line and the second data line and configured to supply the second data voltage to the second electrode in the fourth pixel region, and an eighth TFT connected to the third gate line and the third data line and configured to supply the third data voltage to the first electrode in the fourth pixel region.

Here, the LCD device may further include a gate driver configured to output a turn-on voltage to the first to fourth gate lines, wherein the gate driver sequentially may output the turn-on voltage to the first to fourth gate lines.

The LCD device may further include a data driver configured to output a data voltage to the data lines by a column inversion method.

Here, the data driver may output the data voltage whose polarity is inverted to the data lines adjacent to each other.

The first and second electrodes may be symmetrically bent with respect to a center line of each of the pixel regions in a plan view.

Each of the first to eighth TFTs may include a gate electrode, and a source electrode and a drain electrode which are spaced apart from each other and formed above the gate electrode, each of the drain electrodes may be connected to the first electrode or the second electrode, and the LCD device may further include a storage capacitor defined as a region in which each of the drain electrodes overlaps a common line disposed below the drain electrodes.

Here, the drain electrodes may include first to third drain electrodes, each of the first to third drain electrodes may include an extending portion and a connecting portion, the extending portion of the first drain electrode may have a first width and a first length and the connecting portion thereof may have a first area, the extending portion of the second drain electrode may have the first width and a second length greater than the first length and the connecting portion thereof may have a second area smaller than the first area, the extending portion of the third drain electrode may have the first width and the first length and the connecting portion thereof may have a third area greater than the second area, and areas of portions including the extending portions and the connecting portions of the first to third drain electrodes may be the same.

The first drain electrode may be connected to each of the first electrode and the second electrode in the first pixel region, and the third drain electrode may be connected to the first electrode in the second pixel region and the second drain electrode may be connected to the second electrode in the second pixel region.

The LCD device may further include a substrate disposed below the first electrode and the second electrode, and a nanocapsule liquid crystal layer disposed above the first electrode and the second electrode.

Here, the nanocapsule liquid crystal layer may be formed in a film form.

The LCD device may further include first and second polarizers respectively disposed below the substrate and above the nanocapsule liquid crystal layer and having polarization axes orthogonal to each other.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are exemplary and explanatory, and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this specification, illustrate embodiments of the disclosure and together with the description serve to explain various principles.

DETAILED DESCRIPTION

Hereinafter, embodiments of the present disclosure will be described with reference to the accompanying drawings.

First Embodiment

Figure 2:
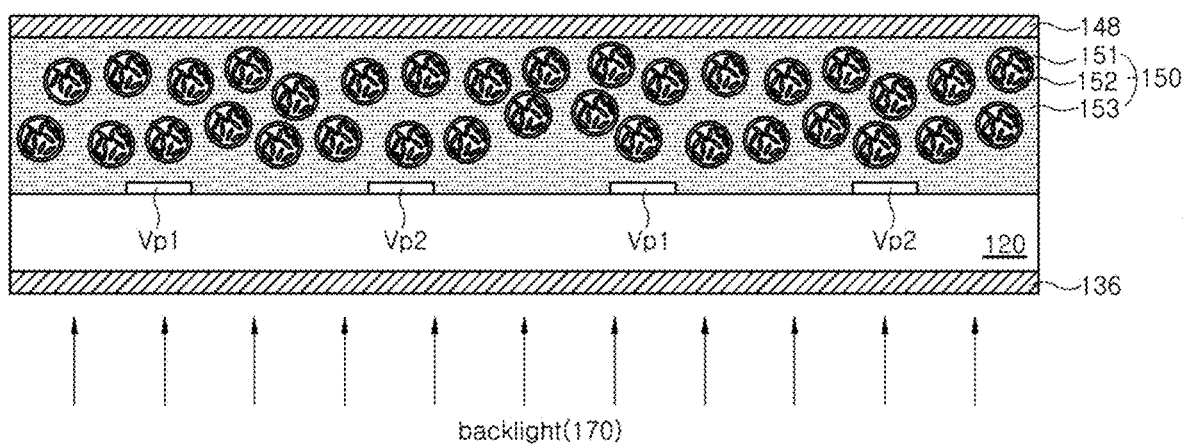
FIG. 2 is a cross-sectional view schematically illustrating an LCD device to which an embodiment of the present disclosure is applied.

FIG. 2 is a cross-sectional view schematically illustrating a liquid crystal display (LCD) device to which an embodiment of the present disclosure is applied.

In the present disclosure, an LCD device, which requires high-voltage driving and includes a nanocapsule liquid crystal layer, will be described as an example, but the present disclosure is not limited thereto.

As illustrated in the drawing, an LCD device 200 according to a first embodiment of the present disclosure includes a substrate 120, first and second electrodes Vp1 and Vp2 disposed on the substrate 120, a nanocapsule liquid crystal layer 150 disposed above the first and second electrodes Vp1 and Vp2, and first and second polarizers 136 and 148 disposed below the substrate 120 and above the nanocapsule liquid crystal layer 150, respectively.

Here, the nanocapsule liquid crystal layer 150 has a nanosize smaller than a size in a visible light wavelength region, and nanocapsules 152 filled with a plurality of irregularly arranged liquid crystal molecules 151 are dispersed in a buffer layer 153.

That is, each of the nanocapsules is a polymer capsule having a diameter of several to several hundred nanometers and may be formed of positive or negative nematic liquid crystals, and the plurality of liquid crystal molecules may be nematic liquid crystal (LC) molecules, ferroelectric liquid crystal (FLC) molecules, or flexo electric LC molecules.

The nanocapsule liquid crystal layer 150 may be formed above the first and second electrodes Vp1 and Vp2 in a film form.

Accordingly, unlike the related art LCD device 100 (in FIG. 1) formed with two substrates, the LCD device 200 may be manufactured with only one substrate 120 so that a lightweight and thin LCD device may be implemented and a manufacturing cost thereof may be reduced.

Since the nanocapsule liquid crystal layer 150 does not have a problem in which a gap is twisted or changed by external pressure or impact, the nanocapsule liquid crystal layer 150 may be effectively applied to a flexible LCD device by forming the substrate 120 of plastic which is a flexible material.

Further, the nanocapsule liquid crystal layer 150 is optically isotropic when an electric field is not applied, but has a property in which, when the electric field is applied, the liquid crystal molecules 151 in the nanocapsules 152 are arranged in a direction of the electric field and double refracts light incident on the nanocapsule liquid crystal layer 150.

Accordingly, the nanocapsule liquid crystal layer 150 may optically form an optical axis according to an applied electric field, and may transmit light through optical property control using the optical axis.

The first polarizer 136 polarizes the light incident on the nanocapsule liquid crystal layer 150 through a backlight 170 or the like which is disposed below the substrate 120. When the light incident on the nanocapsule liquid crystal layer 150 is transmitted as is without being polarized by a birefringent effect of the nanocapsule liquid crystal layer 150, the second polarizer 148 blocks the transmitted light.

Here, polarization axes of the first and second polarizers 136 and 148 are orthogonal to each other. That is, when the polarization axis of the first polarizer 136 is 0° (or 90°), the polarization axis of the second polarizer 148 may be 90° (or 0°).

Hereinafter, a driving principle of the LCD device 200 including the nanocapsule liquid crystal layer 150 will be described.

First, when an electric field is not applied to the first and second electrodes Vp1 and Vp2, the nanocapsule liquid crystal layer 150 intactly transmits light incident through the first polarizer 136 so that the LCD device 200 displays a black state.

That is, in an off state in which no electric field is applied, the light, which is incident from the backlight 170 selectively passes through the first polarizer 136 at a specific angle and is then incident on the nanocapsule liquid crystal layer 150 again, passes intactly through the nanocapsule liquid crystal layer 150 with almost no scattering phenomenon and reaches the second polarizer 148.

As a result, the light transmitted as is through the first polarizer 136 having a polarization axis of 0° is incident on the second polarizer 148 having a polarization axis of 90°, and accordingly, the corresponding incident light is blocked by the second polarizer 148 orthogonal to the first polarizer 136 so that the LCD device 200 displays a black state.

As described above, in order to display a grayscale, unlike the related art LCD device 100 (in FIG. 1) in which a pair of alignment layers are necessarily interposed between a pair of substrates facing each other and liquid crystals are injected therebetween and are aligned to have a specific pitch and direction, since the LCD device 200 according to the first embodiment of the present disclosure may display a black state using inherent optical characteristics of the nanocapsule liquid crystal layer 150, no separate liquid crystal alignment is required.

Accordingly, in the LCD device 200 according to the first embodiment of the present disclosure, alignment layer printing and rubbing processes which have been required for the related art LCD device 100 (in FIG. 1) may be omitted.

Next, when an electric field is applied to the first and second electrodes Vp1 and Vp2, the nanocapsule liquid crystal layer 150 rotates the polarization axis of the light incident through the first polarizer 136 by 90° so that the LCD device 200 displays a white state.

Specifically, in an on state in which an electric field is applied, since the liquid crystal molecules 151 inside the nanocapsule 152 are arranged to be parallel to a direction of the electric field, a birefringent effect due to the alignment of the liquid crystal molecules 151 is made.

In this case, the polarization of the light incident through the first polarizer 136 is changed by the birefringent effect of the nanocapsule liquid crystal layer 150. When a degree of birefringence ($\Delta n * d$) of the nanocapsule liquid crystal layer 150 satisfies a condition of $\lambda/2$ of incident light, a polarization axis of the incident light is rotated by 90°, and the light intactly passes through the second polarizer 148 orthogonal to the first polarizer 136 without being absorbed so that the LCD device 200 displays a white state.

Here, each of the first electrode Vp1 and the second electrode Vp2 may be a pixel electrode. That is, the first electrode Vp1 and the second electrode Vp2 may be respectively formed with two pixel electrodes Vp1 and Vp2 to which the thin film transistor (TFT) T (in FIG. 1) is connected.

Figure 3:
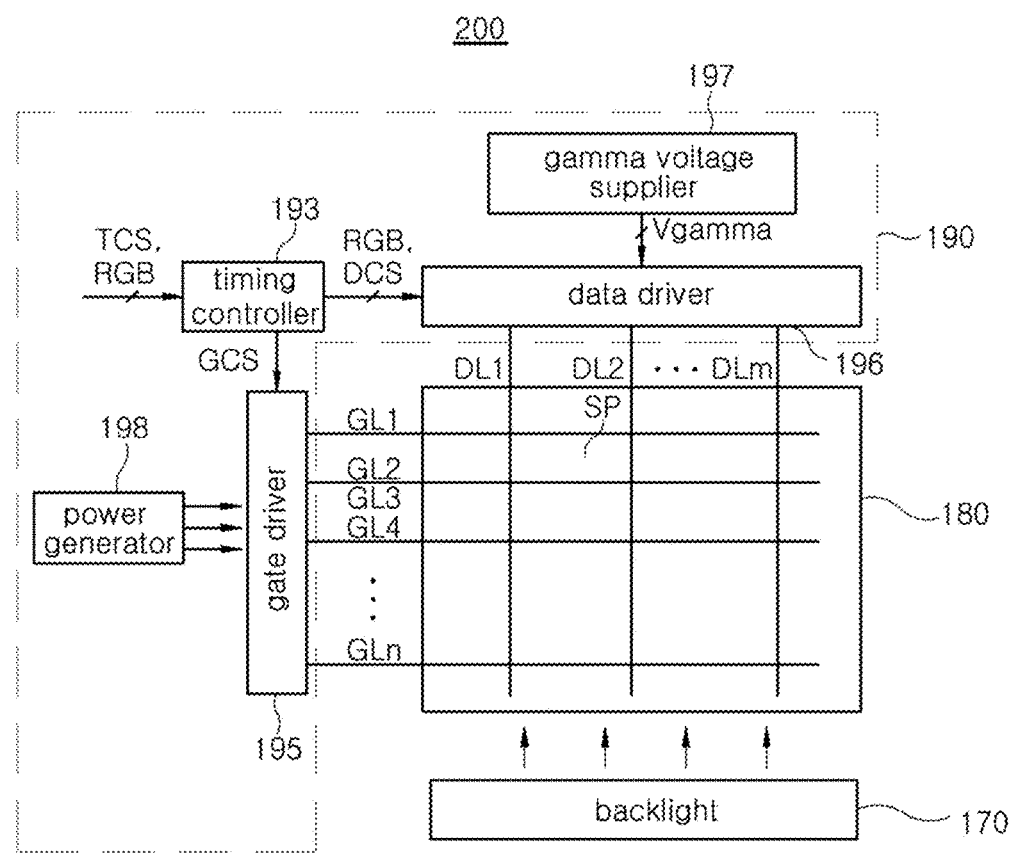
FIG. 3 is a configuration diagram schematically illustrating the LCD device to which the embodiment of the present disclosure is applied.

FIG. 3 is a configuration diagram schematically illustrating the LCD device to which the embodiment of the present disclosure is applied.

As illustrated in FIG. 3, the LCD device 200 according to the embodiment of the present disclosure includes a liquid crystal panel 180, a driving circuit 190, and a backlight 170.

The liquid crystal panel 180 has a plurality of gate lines GL1 to GLn which extend in a first direction, for example, a horizontal direction (a row direction).

Further, a plurality of data lines DL1 to DLm extend in a second direction which intersects the first direction, for example, a vertical direction (a column direction).

As described above, a plurality of pixel regions SP disposed in a matrix form are defined by the plurality of gate lines GL1 to GLn and the plurality of data lines DL1 to DLm, which intersect each other.

Each of the pixel regions SP of the liquid crystal panel 180 may include the TFT T (in FIG. 1), a liquid crystal capacitor (not illustrated), and a storage capacitor (not illustrated).

The TFT T (in FIG. 1) is formed at each of the intersections of the plurality of gate lines GL1 to GLn and the plurality of data lines DL1 to DLm.

Figure 1:
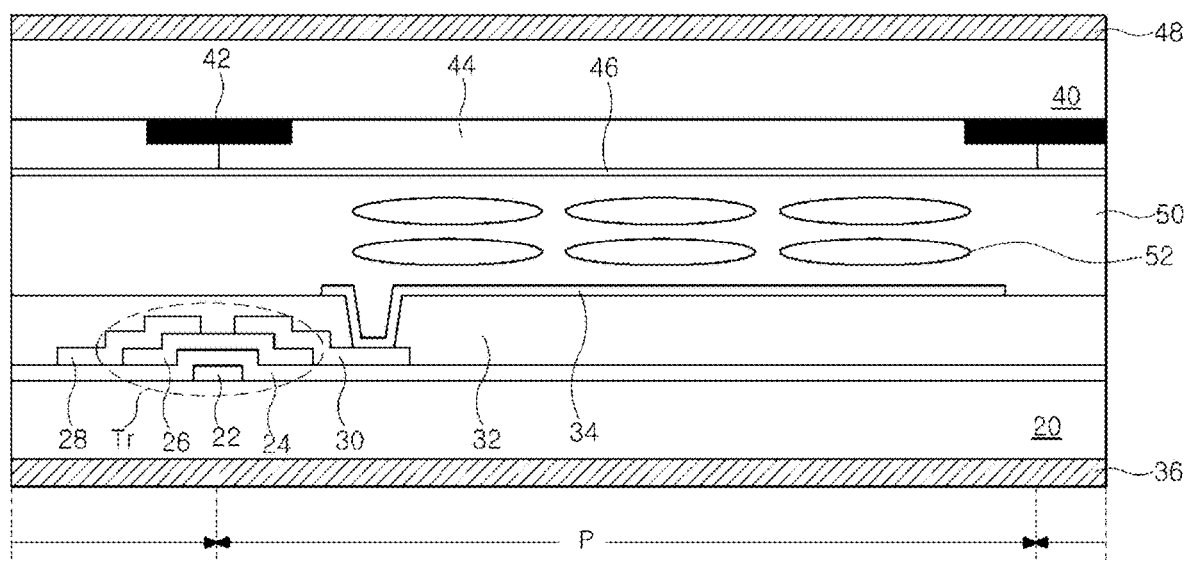
FIG. 1 is a cross-sectional view schematically illustrating a related art liquid crystal display (LCD) device.

Here, each of the first electrode Vp1 (in FIG. 2) and the second electrode Vp2 (in FIG. 2) may be connected to the TFT T (in FIG. 1). That is, two TFTs T (in FIG. 1) may be disposed in each of the pixel regions SP.

Meanwhile, when a data voltage is applied to the first electrode Vp1 (in FIG. 2) and the second electrode Vp2 (in FIG. 2), an electric field is formed therebetween and the nanocapsule liquid crystal layer 150 (in FIG. 2) is driven.

The nanocapsule liquid crystal layer 150 (in FIG. 2) located above the first electrode Vp1 (in FIG. 2) and the second electrode Vp2 (in FIG. 2) constitutes a liquid crystal capacitor. Meanwhile, a storage capacitor is further provided in each of the pixel regions SP, and serves to store the data voltage applied to the first electrode Vp1 (in FIG. 2) and the second electrode Vp2 (in FIG. 2) until a next frame.

R, G, B pixel regions SP which display red, green, and blue, respectively, may be used as the pixel regions SP. Here, the R, G, B pixel regions SP adjacent to each other in a horizontal direction constitute a pixel which is a unit of image display.

The backlight 170 serves to supply light to the liquid crystal panel 180. A cold cathode fluorescent lamp (CCFL), an external electrode fluorescent lamp (EEFL), a light-emitting diode (LED), or the like may be used as a light source of the backlight 170.

The driving circuit 190 may include a timing controller 193, a gate driver 195, a data driver 196, a gamma voltage supplier 197, and a power generator 198.

Here, the timing controller 193 receives image data RGB, and a control signal TCS such as a vertical synchronization signal, a horizontal synchronization signal, a main clock signal, a data enable signal, or the like from an external system such as a TV system or a video card. Meanwhile, although not illustrated, such signals may be input through an interface configured in the timing controller 193.

The timing controller 193 generates a data control signal DCS for controlling the data driver 196 using the input control signal TCS.

The data control signal DCS may include a source start pulse (SSP), a source sampling clock (SSC), a source output enable (SOE) signal, a polarity (POL) signal, and the like.

Further, the timing controller 193 may receive the image data RGB from an external system, align the image data RGB, and transfer the image data RGB to the data driver 196.

Further, the timing controller 193 may generate a gate control signal GCS for controlling the gate driver 195 in response to the input control signal TCS.

The gamma voltage supplier 197 may generate a gamma voltage Vgamma by dividing a high potential voltage and a low potential voltage which are generated from the power generator 198, and may supply the gamma voltage Vgamma to the data driver 196.

Here, the data driver 196 supplies the data voltage to the plurality of data lines DL1 to DLm in response to the data control signal DCS and the image data RGB which are supplied from the timing controller 193.

That is, the data voltage corresponding to the image data RGB may be generated using the gamma voltage Vgamma, and the generated data voltage may be supplied to the corresponding data lines DL1 to DLm.

The power generator 198 may generate various driving voltages required for driving the LCD device 200.

For example, the power generator 198 may generate a power voltage, which is supplied to the timing controller 193, the data driver 196, and the gate driver 195, a gate high voltage Vgh and a gate low voltage Vgl which are supplied to the gate driver 195, and the like.

The gate driver 195 may sequentially select the plurality of gate lines GL1 to GLn in response to the gate control signal GCS supplied from the timing controller 193, and may output a turn-on voltage to the selected one of the gate lines GL1 to GLn.

Here, the TFT T (in FIG. 1) connected to the corresponding one of the gate lines GL1 to GLn may be turned on by the turn-on voltage.

Meanwhile, a turn-off voltage is supplied to the gate lines GL1 to GLn until a next frame is selected and the TFT T (in FIG. 1) may be maintained in a turned-off state.

Figure 4A:
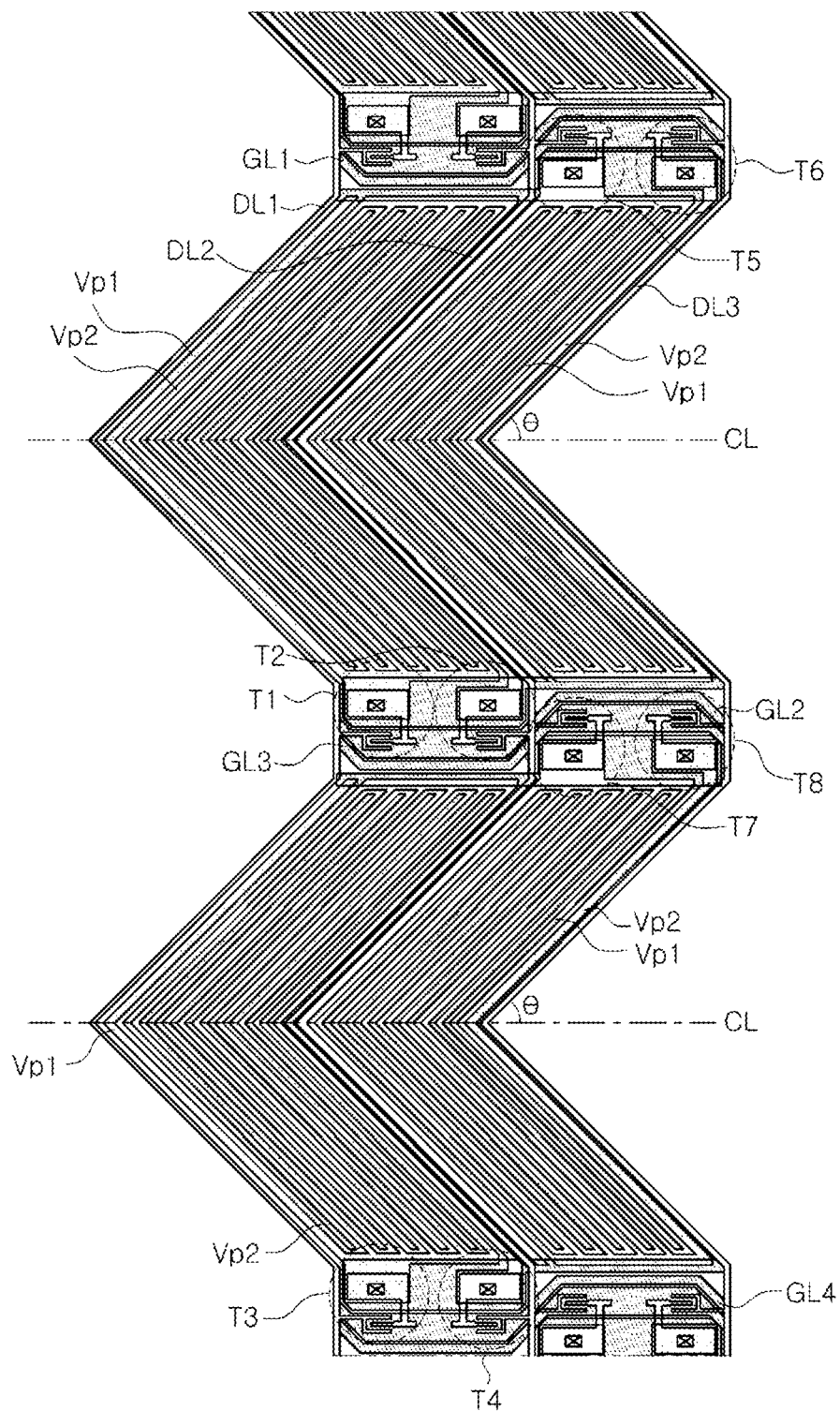
FIG. 4A is a plan view of an LCD device according to a first embodiment of the present disclosure.
Figure 4B:
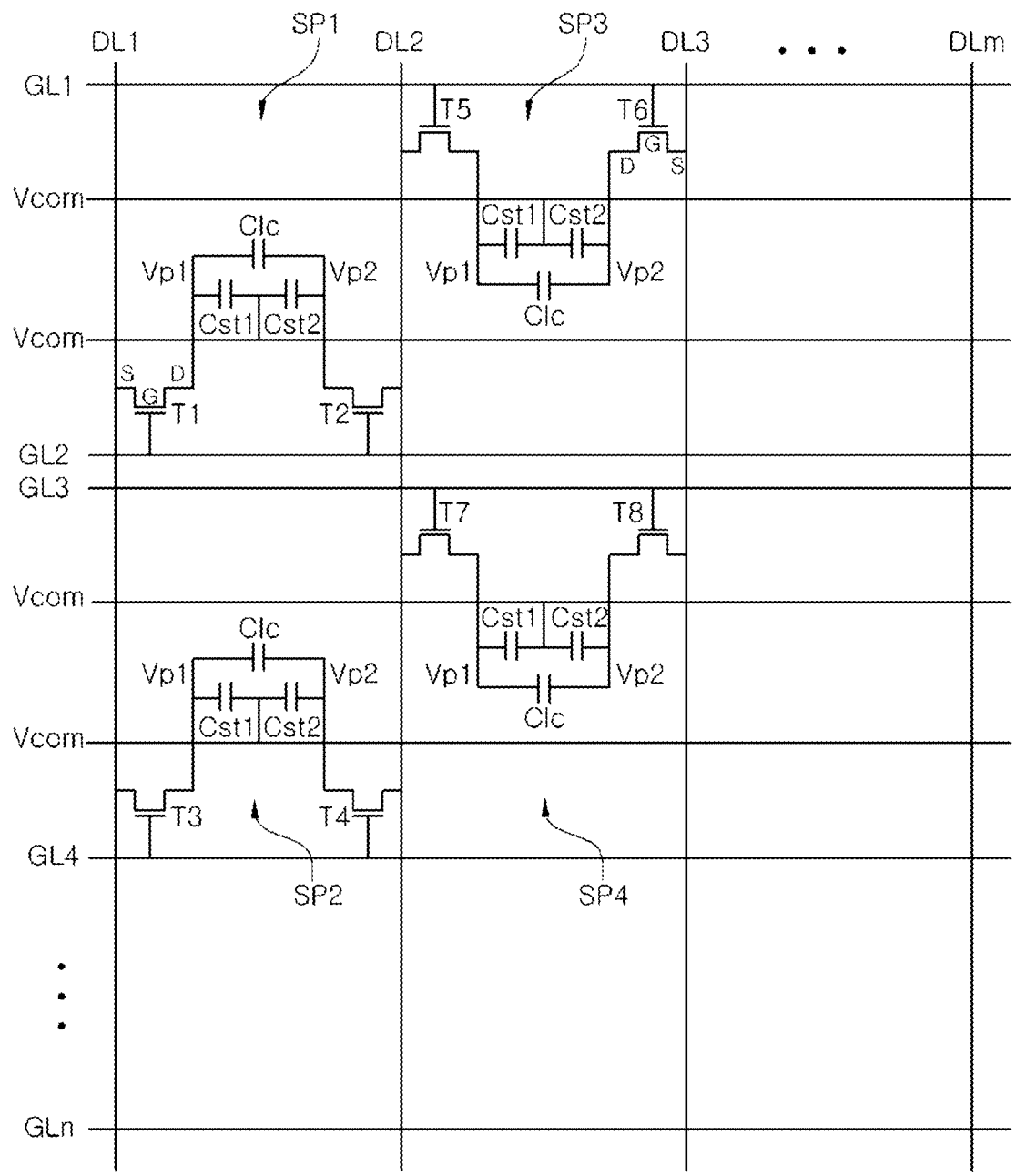
FIG. 4B is a view schematically illustrating pixel regions of the LCD device according to the first embodiment of the present disclosure.

FIG. 4A is a plan view of an LCD device according to a first embodiment of the present disclosure, and FIG. 4B is a view schematically illustrating pixel regions of the LCD device according to the first embodiment of the present disclosure.

Hereinafter, first to fourth pixel regions SP1 to SP4 which are portions of the LCD device according to the first embodiment of the present disclosure will be described as an example.

As illustrated in FIGS. 4A and 4B, the LCD device 200 (in FIG. 3) according to the first embodiment of the present disclosure may include first to fourth gate lines GL1 to GL4 which are sequentially spaced apart from each other in parallel, first to third data lines DL1 to DL3, which intersect the first to fourth gate lines GL1 to GL4 and respectively define first to fourth pixel regions SP1 to SP4, first and second electrodes Vp1 and Vp2 disposed in the first to fourth pixel regions SP1 to SP4, and first to eighth TFTs T1 to T8 disposed in the first to fourth pixel regions SP1 to SP4.

Specifically, the first and second electrodes Vp1 and Vp2 may have a plurality of bars, and the plurality of bars may be alternately spaced apart from each other and may have a symmetrically bent shape with respect to a center line CL of each of the pixel regions SP1 to SP4 in a plan view.

Accordingly, the first to third data lines DL1 to DL3 may also have a symmetrically bent shape with respect to the center line CL of each of the pixel regions SP1 to SP4 in a plan view.

That is, the first and second electrodes Vp1 and Vp2 and the first to third data lines DL1 to DL3 may be inclined by θ° with respect to the center line CL of each of the pixel regions SP1 to SP4. For example, θ° may range from 30° to 90°, and more preferably, may be 45°.

By doing this, generation of a color difference due to a change in a viewing angle may be prevented.

Referring to FIG. 4B, the first TFT T1 may be connected to the second gate line GL2 and the first data line DL1, and a first data voltage may be supplied to the first electrode Vp1 in the first pixel region SP1.

The second TFT T2 may be connected to the second gate line GL2 and the second data line DL2, and a second data voltage having a level opposite the first data voltage may be supplied to the second electrode Vp2 in the first pixel region SP1.

The third TFT T3 may be connected to the fourth gate line GL4 and the first data line DL1, and the first data voltage may be supplied to the first electrode Vp1 in the second pixel region SP2.

The fourth TFT T4 may be connected to the fourth gate line GL4 and the second data line DL2, and the second data voltage may be supplied to the second electrode Vp2 in the second pixel region SP2.

The fifth TFT T5 may be connected to the first gate line GL1 and the second data line DL2, and the second data voltage may be supplied to the first electrode Vp1 in the third pixel region SP3.

The sixth TFT T6 may be connected to the first gate line GL1 and the third data line DL3, and a third data voltage having a level opposite the second data voltage may be supplied to the second electrode Vp2 in the third pixel region SP3.

The seventh TFT T7 may be connected to the third gate line GL3 and the second data line DL2, and the second data voltage may be supplied to the first electrode Vp1 in the fourth pixel region SP4.

The eighth TFT T8 may be connected to the third gate line GL3 and the third data line DL3, and the third data voltage may be supplied to the second electrode Vp2 in the fourth pixel region SP4.

Here, each of the first to eighth TFTs T1 to T8 may include a gate electrode G connected to the gate line GLn, a source electrode S connected to the data line DLm, and a drain electrode D connected to the first or second electrode Vp1 or Vp2.

Further, liquid crystals located between the electrodes Vp1 and Vp2 constitute a liquid crystal capacitor Clc.

A common line Vcom is formed to be parallel to the gate line GLn for forming storage capacitors Cst1 and Cst2.

The storage capacitors Cst1 and Cst2 serve to constantly maintain a voltage applied to a liquid crystal capacitor until a next signal is received.

The storage capacitors Cst1 and Cst2 have effects such as stabilization of grayscale display and reduction of a flicker and an afterimage in addition to the signal maintaining.

Hereinafter, a method of driving the LCD device 200 (in FIG. 3) according to the first embodiment of the present disclosure will be described.

First, in the related art LCD device 100 (in FIG. 1), only the data voltage, which is supplied from the data line to the pixel electrode 34 (in FIG. 1), is swung.

That is, positive polarity (+) and negative polarity (−) of the data voltage are repeatedly supplied from the data line to the pixel electrode 34 on the basis of a constant common voltage which is supplied from the common line to the common electrode 46.

However, in the LCD device 200 according to the first embodiment of the present disclosure, two pixel electrodes formed with the first and second electrodes Vp1 and Vp2 are disposed in one pixel region, and all of data voltages applied thereto are swung.

Data voltages having levels opposite each other are supplied from the odd-numbered data lines DLm and the even-numbered data lines DLm. For example, when a positive (+) voltage is supplied from the first data line DL1 and the third data line DL3, which are odd-numbered on the basis of the constant common voltage, a negative (−) voltage opposite the positive (+) voltage of the first and third data voltages DL1 and DL3 is supplied from the second data line DL2 which is even-numbered.

Accordingly, in one pixel region, the second electrode Vp2 may be supplied with a negative (−) voltage when the first electrode Vp1 is a positive (+) voltage, and the second electrode Vp2 may be supplied with a positive (+) voltage when the first electrode Vp1 is a negative (−) voltage. Therefore, a voltage difference between the first electrode Vp1 and the second electrode Vp2 may be formed twice as high.

Therefore, in comparison with the related art LCD device 100 (in FIG. 1), the LCD device 200 according to the first embodiment of the present disclosure may apply a driving voltage twice as high to each of the pixel regions SP1 to SP4, and thus a transmittance ratio of the nanocapsule liquid crystal layer 150 (in FIG. 2) may be improved.

Figures 4C, 4D:
FIG. 4C is a photograph illustrating a state in which a driving circuit of the LCD device according to the first embodiment of the present disclosure is burned.
FIG. 4D is a view schematically illustrating polarities in each of pixel regions of a liquid crystal panel.

FIG. 4C is a photograph illustrating a state in which the driving circuit of the LCD device according to the first embodiment of the present disclosure is burned, and FIG. 4D is a view schematically illustrating polarities of data voltages which are supplied to the first electrode and the second electrode in each of the pixel regions.

In the LCD device 200 (in FIG. 3), when it is intended to display another image after driving a specific still image for a long time, a pattern of the previous image may remain, and such an image is referred to as an afterimage.

Here, the afterimage is generated when a direct current (DC) voltage is applied to the liquid crystal layer 150 (in FIG. 2) between the first electrode Vp1 and the second electrode Vp2.

Since the liquid crystal molecules 151 (in FIG. 2) basically has refractive index anisotropy and is easily degraded by a DC voltage, an afterimage is easily generated, and alternating current (AC) driving is generally performed to prevent the generation of the afterimage.

Therefore, since the above phenomenon may be intensified when polarities applied to the first electrode Vp1 and the second electrode Vp2 always have fixed values, the polarities of the applied voltages are differently set according to a frame or a position. Inversion methods for this are divided into a frame inversion method, a line inversion method, a column inversion method, and a dot inversion method.

Among these inversion methods, a dot inversion method is a method in which suppression against screen distortion such as flicker or crosstalk is more effective than the other inversion methods.

However, like the LCD device 200 (in FIG. 3) according to the first embodiment of the present disclosure, in a structure in which the TFT T (in FIG. 1) is connected to each of the first electrode Vp1 (in FIG. 4B) and the second electrode Vp2 (in FIG. 4B) in one pixel region so as to enable high-voltage driving and the nanocapsule liquid crystal layer 150 (in FIG. 3) is driven using the voltage difference between the first electrode Vp1 (in FIG. 4B) and the second electrode Vp2 (in FIG. 4B), since an output of the data driver 196 (in FIG. 3) (i.e., the data D-IC) should be changed every one horizontal period in order to implement a dot inversion method, heat is generated in the data driver 196 (in FIG. 3).

Therefore, as illustrated in FIG. 4C, a burning problem occurs due to the heat of the data driver 196 (in FIG. 3), and thus the output of the data driver (in FIG. 3) should be driven by a column inversion method.

Accordingly, as illustrated in FIG. 4D, the same polarity is arranged in a vertical direction by the column inversion driving, and accordingly, a screen distortion problem such as a flicker between vertical lines due to crosstalk between pixels in the vertical direction occurs.

As described above, in the LCD device 200 (in FIG. 3) according to the first embodiment of the present disclosure, a TFT (T1 to T8 in FIG. 4B) may be connected to each of the first electrode Vp1 (in FIG. 4B) and the second electrode Vp2 (in FIG. 4B) in one pixel region, a driving voltage twice as high may be applied to each of the pixel regions SP1 to SP4 using the voltage difference between the first electrode Vp1 (in FIG. 4B) and the second electrode Vp2 (in FIG. 4B), and thus the transmittance ratio of the nanocapsule liquid crystal layer 150 (in FIG. 2) may be improved.

However, when the output of the data driver 196 (in FIG. 3) is driven by a dot inversion method, the data driver 196 (in FIG. 3) is burned due to heat generation so that the output of the data driver 196 (in FIG. 3) should be driven by a column inversion method, and thus a screen distortion problem such as a flicker occurs.

Second Embodiment

Hereinafter, a detailed description of the same or similar configuration to that in the first embodiment may be omitted.

Figure 5A:
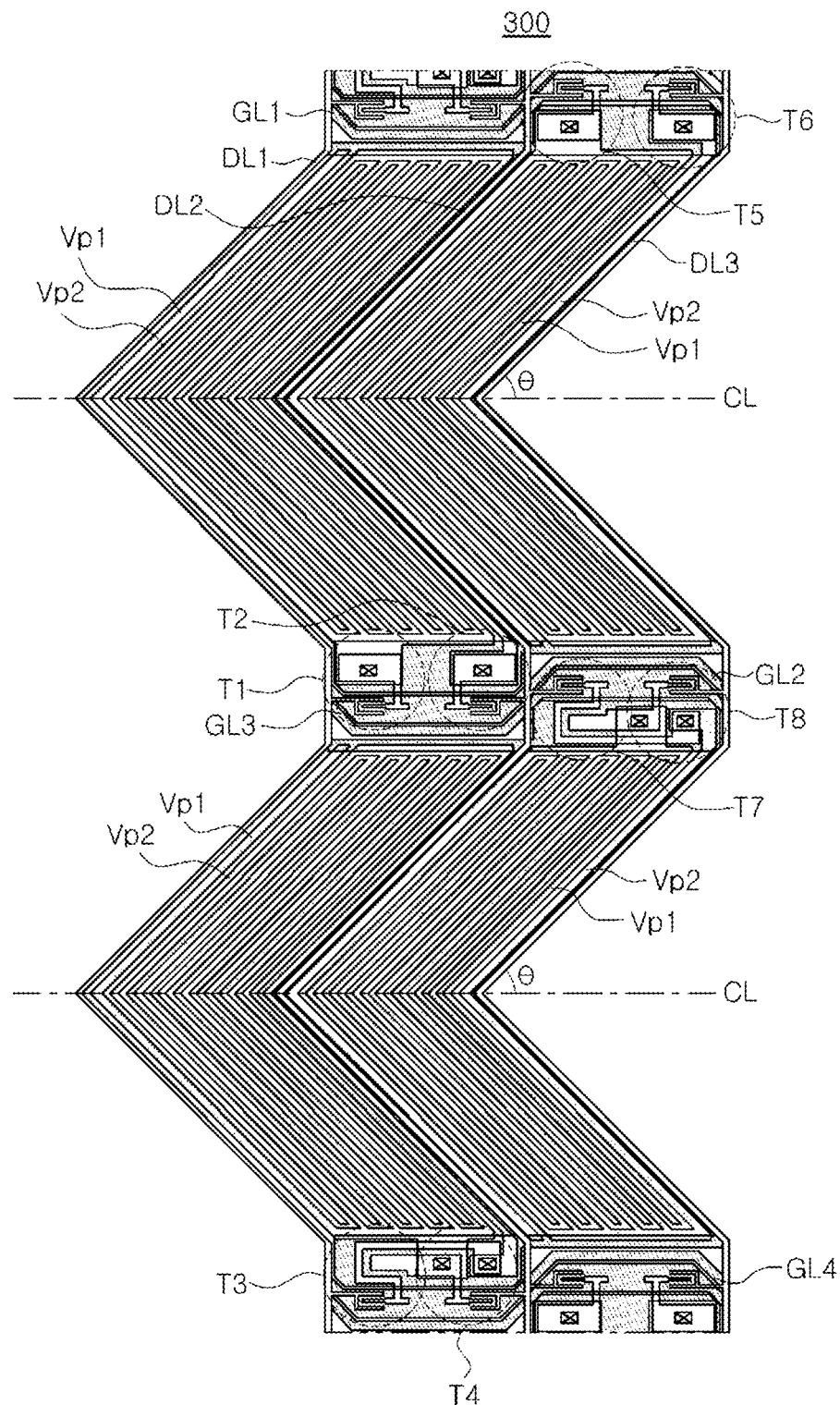
FIG. 5A is a plan view of an LCD device according to a second embodiment of the present disclosure.
Figure 5B:
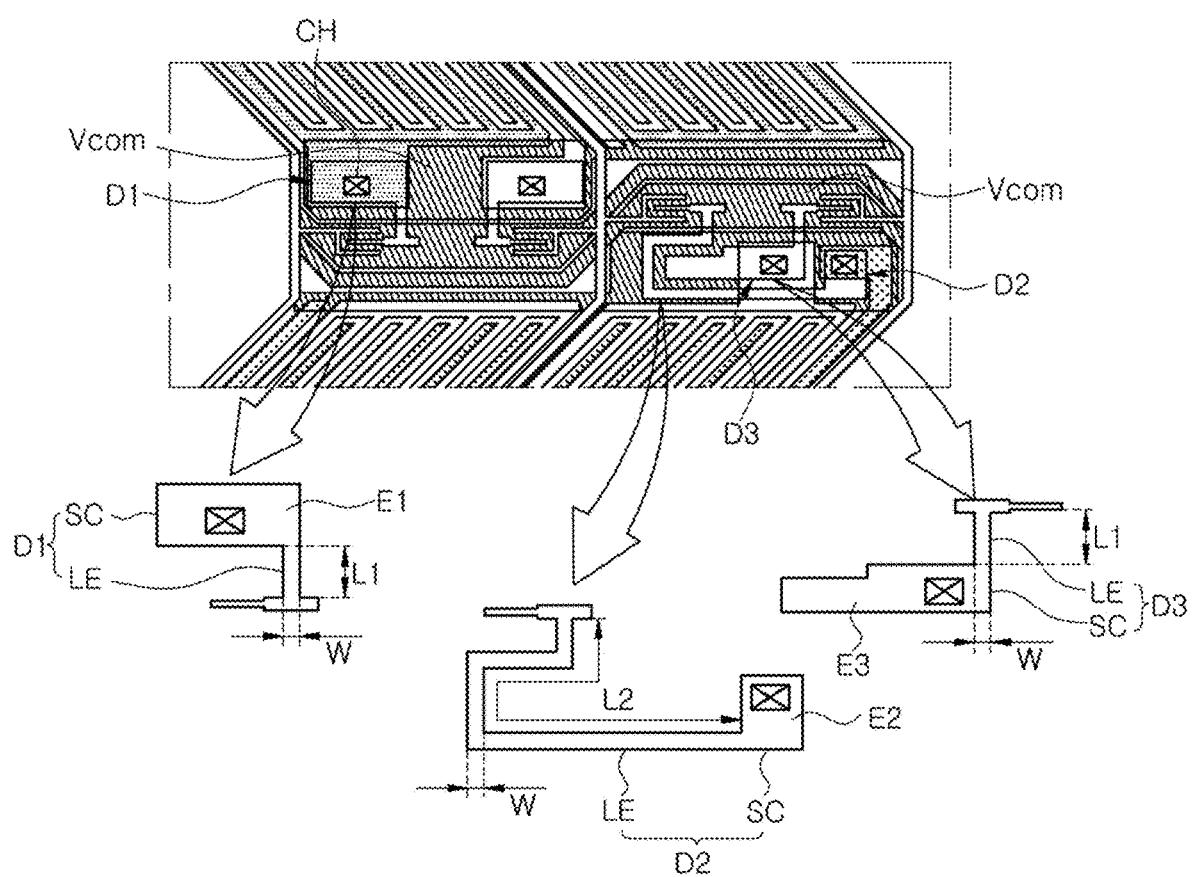
FIG. 5B is an enlarged view schematically illustrating a shape of a drain electrode of the LCD device according to the second embodiment of the present disclosure.
Figure 6:
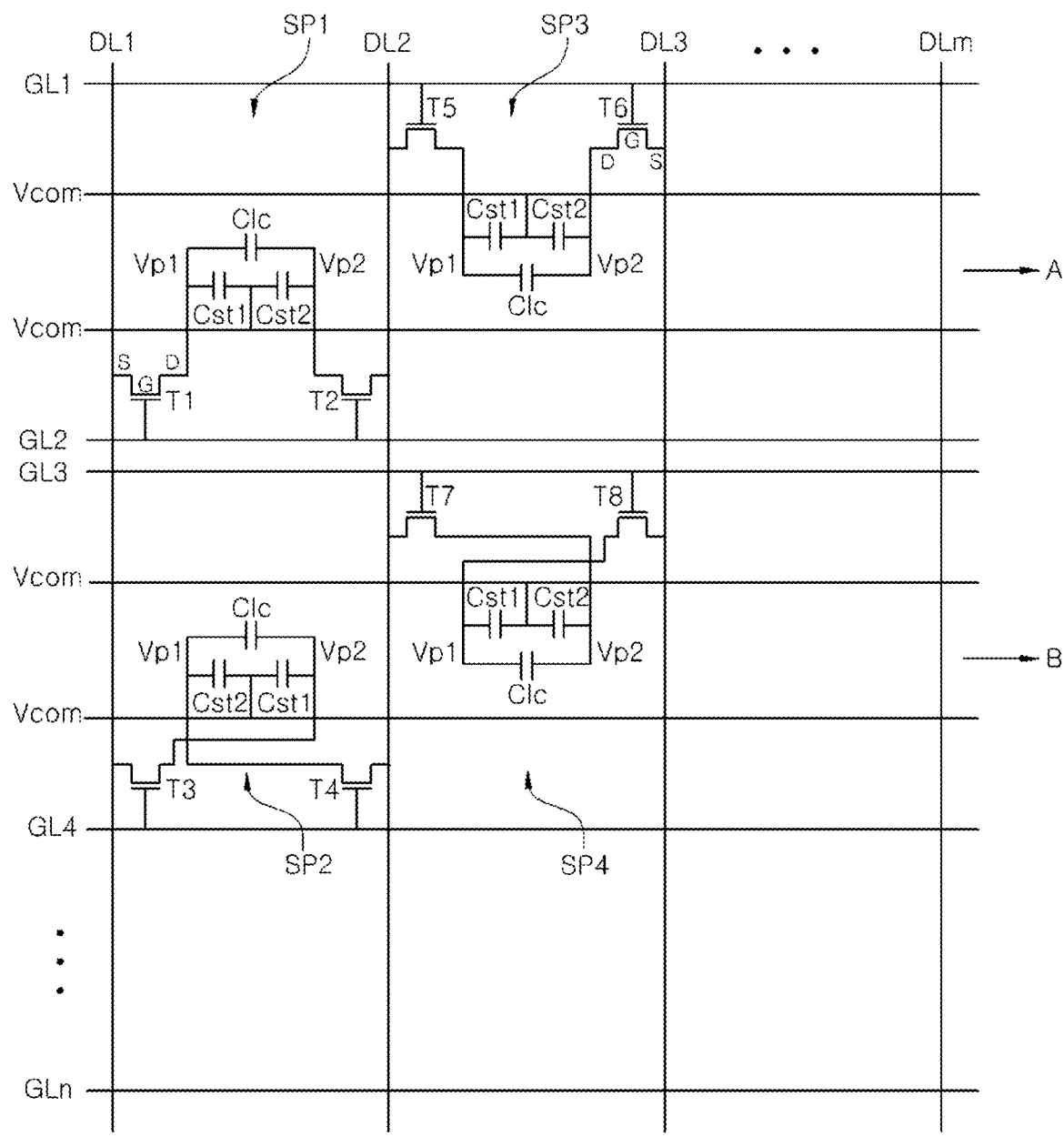
FIG. 6 is a view schematically illustrating pixel regions of the LCD device according to the second embodiment of the present disclosure.
Figures 7A, 7B:
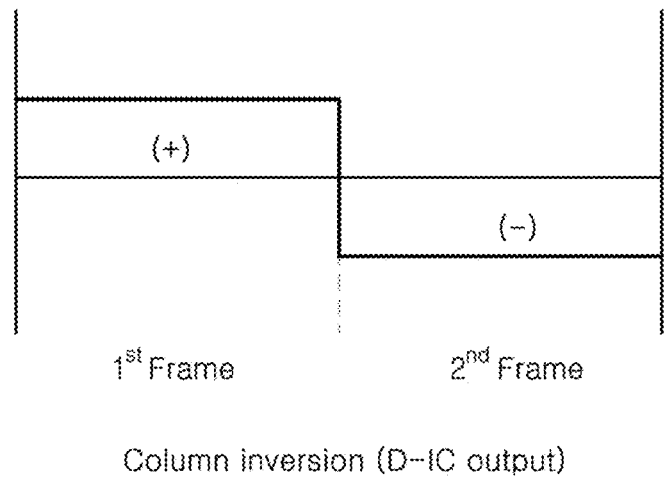
FIG. 7A is a view schematically illustrating an inversion period of polarity of a voltage output from a data driver as an example of the second embodiment of the present disclosure.
FIG. 7B is a view schematically illustrating polarities in pixel regions of a liquid crystal panel.

FIG. 5A is a plan view of an LCD device according to a second embodiment of the present disclosure, FIG. 5B is an enlarged view schematically illustrating a shape of a drain electrode of the LCD device according to the second embodiment of the present disclosure, FIG. 6 is a view schematically illustrating pixel regions of the LCD device according to the second embodiment of the present disclosure, FIG. 7A is a view schematically illustrating an inversion period of polarity of a voltage output from a data driver as an example of the second embodiment of the present disclosure, and FIG. 7B is a view schematically illustrating polarities in each of the pixel regions.

Hereinafter, first to fourth pixel regions SP1 to SP4 which are portions of the LCD device according to the second embodiment of the present disclosure will be described as an example.

As illustrated in the drawings, an LCD device 300 according to the second embodiment of the present disclosure may include first to fourth gate lines GL1 to GL4 which are sequentially spaced apart from each other in parallel, first to third data lines DL1 to DL3, which intersect the first to fourth gate lines GL1 to GL4 and respectively define first to fourth pixel regions SP1 to SP4, first and second electrodes Vp1 and Vp2 disposed in the first to fourth pixel regions SP1 to SP4, and first to eighth TFTs T1 to T8 disposed in the first to fourth pixel regions SP1 to SP4.

Specifically, the first and second electrodes Vp1 and Vp2 may have a plurality of bars, and the plurality of bars are alternately spaced apart from each other and may have a symmetrically bent shape with respect to a center line CL of each of the pixel regions SP1 to SP4 in a plan view.

Accordingly, the first to third data lines DL1 to DL3 may also have a symmetrically bent shape with respect to the center line CL of each of the pixel regions SP1 to SP4 in a plan view.

That is, the first and second electrodes Vp1 and Vp2 and the first to third data lines DL1 to DL3 may be inclined by θ° with respect to the center line CL of each of the pixel regions SP1 to SP4. For example, θ° may range from 30° to 90°, and more preferably, may be 45°.

By doing this, generation of a color difference due to a change in a viewing angle may be prevented.

The first TFT T1 may be connected to the second gate line GL2 and the first data line DL1, and a first data voltage may be supplied to the first electrode Vp1 in the first pixel region SP1.

The second TFT T2 may be connected to the second gate line GL2 and the second data line DL2, and a second data voltage having a level opposite the first data voltage may be supplied to the second electrode Vp2 in the first pixel region SP1.

The third TFT T3 may be connected to the fourth gate line GL4 and the first data line DL1, and the first data voltage may be supplied to the second electrode Vp2 in the second pixel region SP2.

The fourth TFT T4 may be connected to the fourth gate line GL4 and the second data line DL2, and the second data voltage may be supplied to the first electrode Vp1 in the second pixel region SP2.

The fifth TFT T5 may be connected to the first gate line GL1 and the second data line DL2, and the second data voltage may be supplied to the first electrode Vp1 in the third pixel region SP3.

The sixth TFT T6 may be connected to the first gate line GL1 and the third data line DL3, and a third data voltage having a level opposite the second data voltage may be supplied to the second electrode Vp2 in the third pixel region SP3.

The seventh TFT T7 may be connected to the third gate line GL3 and the second data line DL2, and the second data voltage may be supplied to the second electrode Vp2 in the fourth pixel region SP4.

The eighth TFT T8 may be connected to the third gate line GL3 and the third data line DL3, and the third data voltage may be supplied to the first electrode Vp1 in the fourth pixel region SP4.

Here, each of the first to eighth TFTs T1 to T8 may include a gate electrode G connected to the gate line GLn, a source electrode S connected to the data line DLm, and a drain electrode D connected to the first or second electrode Vp1 or Vp2.

Further, liquid crystals located between the electrodes Vp1 and Vp2 constitute a liquid crystal capacitor Clc.

A common line Vcom is formed to be parallel to the gate line GLn for forming storage capacitors Cst1 and Cst2.

The storage capacitors Cst1 and Cst2 serve to constantly maintain a voltage applied to a liquid crystal capacitor until a next signal is received.

The storage capacitors Cst1 and Cst2 have effects such as stabilization of grayscale display and reduction of a flicker and an afterimage in addition to the signal maintaining.

More specifically, each of the first to eighth TFTs T1 to T8 may include the gate electrode G, and the source electrode S and the drain electrode D which are formed above the gate electrode G to be spaced apart from each other.

That is, each of the first to eighth TFTs T1 to T8 may include the gate electrode G constituting a portion of the gate line GL, the source electrode S connected to the data line DL, and the drain electrode D electrically connected to the first electrode Vp1 or the second electrode Vp2.

In addition, each of the first to eighth TFTs T1 to T8 may include the storage capacitors Cst1 and Cst2 which are defined as regions in which each of the drain electrodes D overlaps the common line Vcom disposed below the drain electrode D.

Here, the drain electrodes D of the LCD device 300 according to the second embodiment of the present disclosure may include first to third drain electrodes D1 to D3. That is, three drain electrodes D1 to D3 having different shapes may be disposed.

In addition, each of the first to third drain electrodes D1 to D3 may include an extending portion LE and a connecting portion SC. A contact hole CH which exposes a portion of the drain electrodes D1 to D3 may be formed in the connecting portion SC, and the drain electrodes D1, D2, and D3 may be connected to the first electrode Vp1 or the second electrode Vp2 through the contact hole CH.

Here, the extending portion LE of the first drain electrode D1 may have a first width W and a first length L1, and the connecting portion SC thereof may have a first area E1.

The extending portion LE of the second drain electrode D2 may have the first width W and a second length L2 greater than the first length L1, and the connecting portion SC thereof may have a second area E2 smaller than the first area E1. That is, the extending portion LE of the second drain electrode D2 may have the same width W as the extending portion LE of the first drain electrode D1 and may be formed to be longer than the extending portion LE of the first drain electrode D1, and the connecting portion SC thereof may be formed to be smaller than the connecting portion SC of the first drain electrode D1.

The extending portion LE of the third drain electrode D3 may have the first width W and the first length L1, and the connecting portion SC thereof may have a third area E3 greater than the second area E2. That is, the extending portion LE of the third drain electrode D3 may have the same width as the first width W of the extending portion LE of the first drain electrode D1, and may have the same length as the first length L1.

The connecting portion SC of the third drain electrode D3 may have a shape in which rectangles having different sizes are bonded.

Here, areas including the extending portions LE and the connecting portions SC of the respective first to third drain electrodes D1, D2, and D3 may be formed to be the same. That is, regions which overlap the common line Vcom disposed below the first to third drain electrodes D1, D2, and D3 may be the same.

Accordingly, the storage capacitors Cst1 and Cst2 may be formed to have the same capacitance.

The first drain electrode D1 may be connected to each of the first electrode Vp1 and the second electrode Vp2 in the first pixel region SP1. That is, two first drain electrodes D1 may be disposed in the first pixel region SP1 (first arrangement).

The third drain electrode D3 may be connected to the first electrode Vp1 in the second pixel region SP2, and the second drain electrode D2 may be connected to the second electrode Vp2. That is, the second and third drain electrodes D2 and D3 having different shapes may be disposed in the second pixel region SP2 (second arrangement).

The first arrangement and the second arrangement may be alternately disposed along columns, and may be alternately disposed along rows.

Two rows may have the first arrangement and the next two rows may have the second arrangement. That is, an arrangement relationship may vary for each two rows.

Alternatively, four rows may have the first arrangement and the next four rows may have the second arrangement. That is, an arrangement relationship may vary for each four rows. As described above, in the LCD device 300 according to the second embodiment of the present disclosure, data voltages which are supplied to the first electrode Vp1 and the second electrode Vp2 in the second pixel region SP2 cross data voltages which are supplied to the first electrode Vp1 and the second electrode Vp2 in the fourth pixel region SP4.

That is, the data voltages which are supplied to the first electrode Vp1 and the second electrode Vp2 in each of the pixel regions in the odd-numbered row may be supplied to the first electrode Vp1 and the second electrode Vp2 in each of the pixel regions in the even-numbered row so as to cross the data voltages which are supplied thereto.

Hereinafter, a method of driving the LCD device 300 according to the second embodiment of the present disclosure will be described.

First, in the related art LCD device 100 (in FIG. 1), only the data voltage, which is supplied from the data line to the pixel electrode 34 (in FIG. 1), is swung.

That is, positive polarity (+) and negative polarity (−) of the data voltages are repeatedly supplied from the data line to the pixel electrode 34 on the basis of a constant common voltage which is supplied from the common line to the common electrode 46 (in FIG. 1).

However, in the LCD device 300 according to the second embodiment of the present disclosure, two pixel electrodes formed with the first and second electrodes Vp1 and Vp2 are disposed in one pixel region, and all of data voltages applied thereto are swung. That is, two TFTs T may be disposed in one pixel region.

Therefore, all of voltages output from the data driver 196 (in FIG. 3) may be used as driving voltages. For example, when an output voltage of the data driver 196 (in FIG. 3) ranges from 0 V to 27 V, a voltage of 27 V may be applied to the first electrode Vp1, a voltage of 0 V may be applied to the second electrode Vp2, and thus a voltage of 27 V may be used as the driving voltage.

Data voltages having levels opposite each other are supplied from the odd-numbered data lines DLm and the even-numbered data lines DLm. For example, when a positive (+) voltage is supplied from the first data line DL1 and the third data line DL3, which are odd-numbered on the basis of the constant common voltage, a negative (−) voltage opposite the positive (+) voltage of the first and third data voltages DL1 and DL3 is supplied from the second data line DL2 which is even-numbered.

For example, when a voltage of 27 V is applied to the odd-numbered data lines DL, a voltage of 0 V may be applied to the even-numbered data lines DL.

In each of the pixel regions SP1 to SP4, on the basis of the constant common voltage, the second electrode Vp2 may be supplied with a negative (−) voltage when the first electrode Vp1 is a positive (+) voltage, and the second electrode Vp2 may be supplied with a positive (+) voltage when the first electrode Vp1 is a negative (−) voltage. Therefore, a voltage difference between the first electrode Vp1 and the second electrode Vp2 may be formed twice as high.

Therefore, in comparison with the related art LCD device 100 (in FIG. 1), the LCD device 300 according to the second embodiment of the present disclosure may apply a driving voltage twice as high to each of the pixel regions SP1 to SP4, and thus the transmittance ratio of the nanocapsule liquid crystal layer 150 (in FIG. 2) may be improved.

Specifically, even when the data voltage is output from the data driver 196 (in FIG. 3) by column inversion, the liquid crystal panel 180 (in FIG. 3) may be implemented by dot inversion.

More specifically, as illustrated in FIG. 7A, polarities of the data voltage are differently set for each frame.

For example, when a data voltage output from an odd-numbered data line DLm in a first frame $1^{ST}$ FRAME has a positive polarity (+) and a data voltage output from an even-numbered data line DLm has a negative polarity (−) on the basis of a constant common voltage, a data voltage output from the odd-numbered data line DLm in a second frame $2^{ND}$ FRAME may have a negative polarity (−) and a data voltage output from the even-numbered data line DLm may have a positive polarity (+).

Referring to FIGS. 6 and 7B, in the first and second pixel regions SP1 and SP2 (in FIG. 6) of the LCD device 300 (in FIG. 5) according to the second embodiment of the present disclosure, the first data voltage applied through the first data line DL1 (in FIG. 6) may be connected to the adjacent first electrode Vp1, and the second data voltage applied through the second data line DL2 (in FIG. 6) may be connected to the adjacent second electrode Vp2 (hereinafter, referred to as first connection A) in the pixel region SP1 (in FIG. 6) in the odd-numbered row.

Further, the first data voltage applied through the first data line DL1 (in FIG. 6) may be connected to the non-adjacent second electrode Vp2, and the second data voltage applied through the second data line DL2 (in FIG. 6) may be connected to the non-adjacent first electrode Vp1 (hereinafter, referred to as second connection B) in the pixel region SP2 (in FIG. 6) in the even-numbered row.

That is, each of the pixel regions SP in the odd-numbered row may have a first connection A relationship, and each of the pixel regions SP in the even-numbered row may have a second connection B relationship which is a connection intersecting the odd-numbered row.

Here, for convenience of description, the pixel region SP in which a positive (+) voltage is applied to the first electrode and a negative (−) voltage is applied to the second electrode is represented by a symbol +, and the pixel region SP in which a negative (−) voltage is applied to the first electrode and a positive (+) voltage is applied to the second electrode is represented by a symbol − on the basis of a constant common voltage for each of the pixel regions SP.

As described above, the respective pixel regions SP have polarities opposite those of all of the adjacent pixel regions SP in the horizontal and vertical directions, and the polarities of the respective pixel regions SP are inverted for each frame.

That is, in the case of the first frame, the data voltage may be supplied to the pixel regions SP so that a positive polarity (+) and a negative polarity (−) are alternately applied, from an upper left pixel region SP toward a right side and a lower side. Then, in the case of the second frame, the data voltage may be supplied to the pixel regions SP so that a negative polarity (−) and a positive polarity (+) are alternately applied, from an upper left pixel region SP toward the right side and the lower side.

Therefore, the output of the data driver 196 (in FIG. 3) is driven by a column inversion method and the liquid crystal panel 180 (in FIG. 3) may be implemented by a dot inversion method. Therefore, a flicker phenomenon may be effectively improved.

As described above, in the LCD device 300 (in FIG. 5) according to the second embodiment of the present disclosure, the transmittance ratio of the nanocapsule liquid crystal layer 140 (in FIG. 2) may be effectively improved through high-voltage driving.

Transmittance ratios of various display devices in addition to the LCD device including the nanocapsule liquid crystal layer 150 (in FIG. 2) may be improved through the high-voltage driving.

Although the output of the data driver 196 (in FIG. 3) is driven by a column inversion method, the liquid crystal panel 180 (in FIG. 3) may be implemented by a dot inversion method. Therefore, a flicker phenomenon may be effectively improved without a problem of heating the data driver 196 (in FIG. 3).

FIGS. 8A to 9B are views schematically illustrating modified examples of the present disclosure.

In the present disclosure, the arrangement of the first connection A and the second connection B may be variously modified as necessary.

Figure 8A:
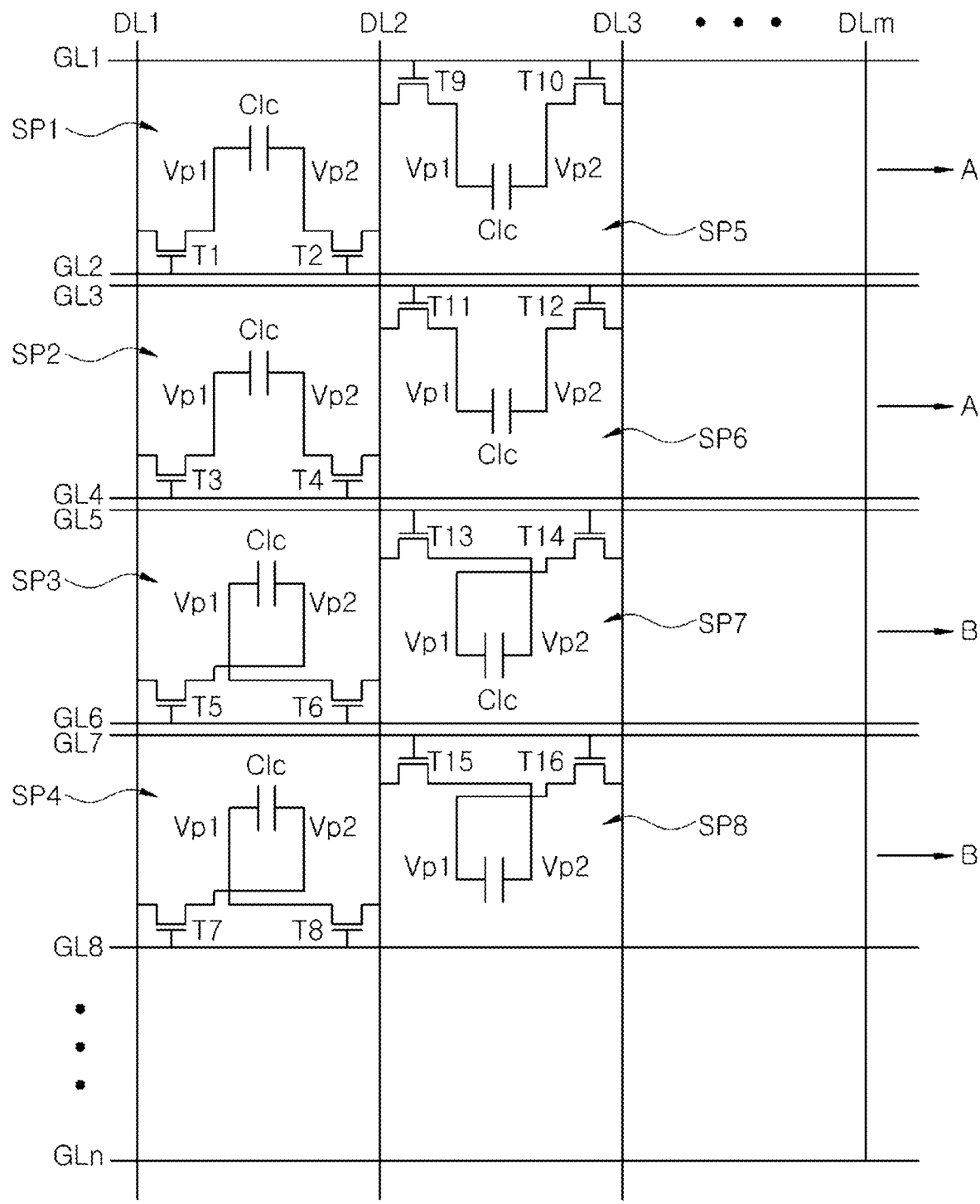
FIGS. 8A to 9B are views schematically illustrating modified examples of the present disclosure.

As illustrated in FIG. 8A, to describe first to eighth pixel regions SP1 to SP8 as an example, an LCD device may include first to eighth gate lines GL1 to GL8 which are sequentially spaced apart from each other in parallel, first to third data lines DL1 to DL3, which intersect the first to eighth gate lines GL1 to GL8 and respectively define first to eighth pixel regions SP1 to SP8, first and second electrodes Vp1 and Vp2 disposed in the first to eighth pixel regions SP1 to SP8, and first to sixteenth TFTs T1 to T16 disposed in the first to eighth pixel regions SP1 to SP8.

Here, pixel regions SP in two rows may be disposed to have a first connection A relationship, and pixel regions SP in the next two rows may be disposed to have a second connection B relationship. That is, an arrangement relationship may vary for each two rows.

For example, pixel regions SP in a first row and pixel regions SP in a second row may have the first connection A relationship, and pixel regions SP in a third row and pixel regions SP in a fourth row may have the second connection B relationship.

Figure 8B:
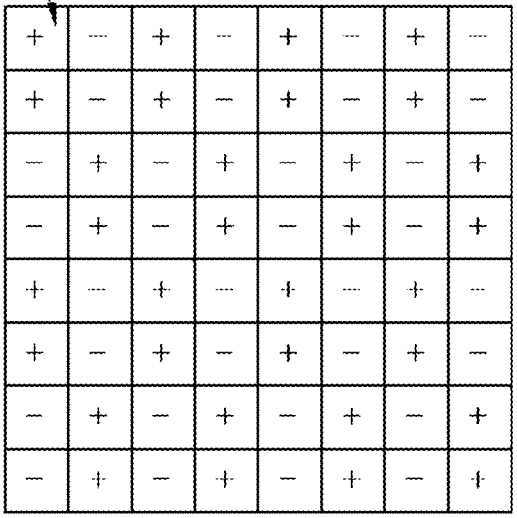

As illustrated in FIG. 8B, the data driver 196 (in FIG. 3) is output through this connection by column inversion, but the liquid crystal panel 180 (in FIG. 3) may be implemented in a form of vertical two dot inversion.

Figure 9A:
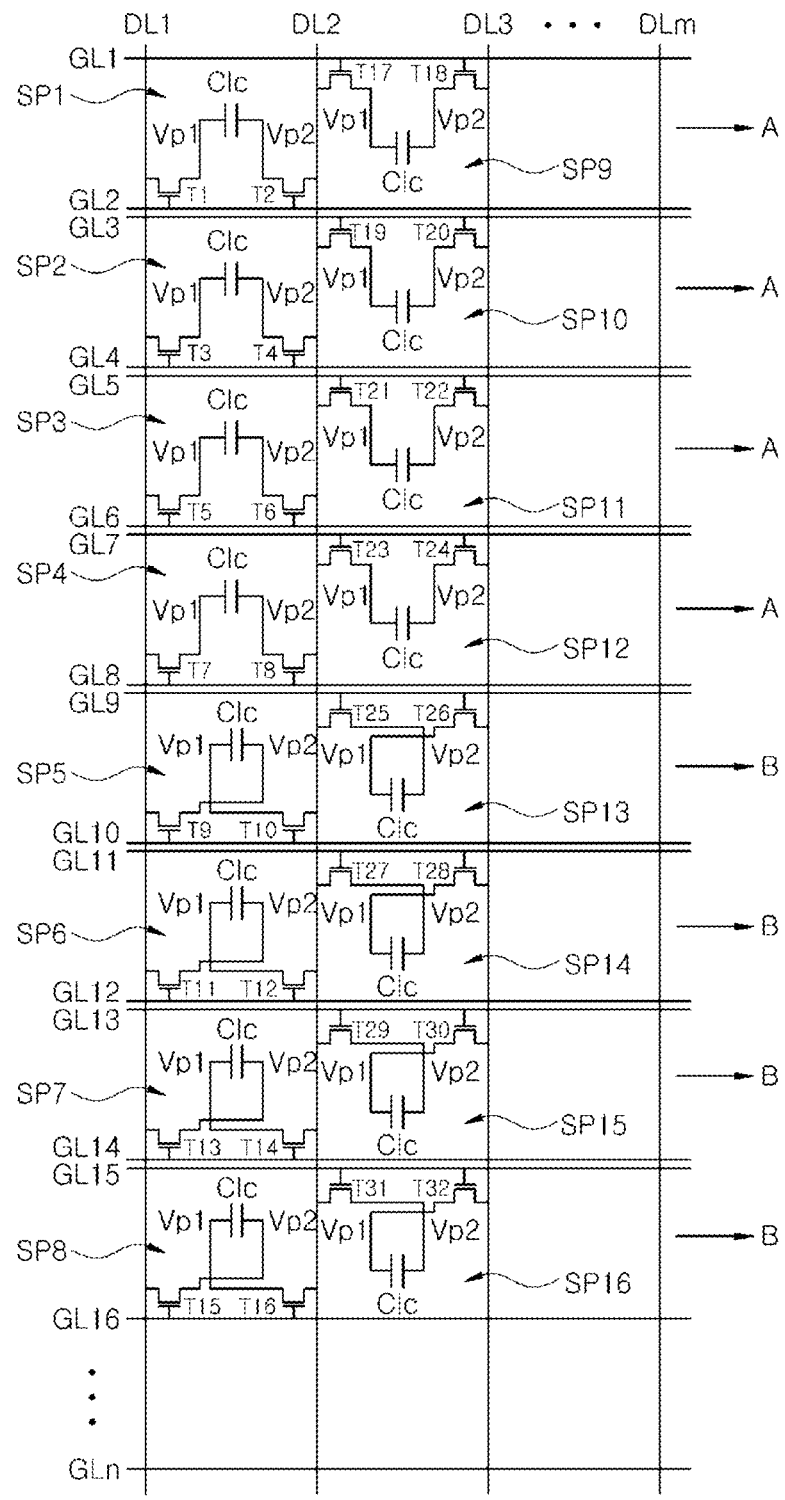

As illustrated in FIG. 9A, an LCD device may include first to sixteenth gate lines GL1 to GL16 which are sequentially spaced apart from each other in parallel, first to third data lines DL1 to DL3, which intersect the first to sixteenth gate lines GL1 to GL16 and respectively define first to sixteenth pixel regions SP1 to SP16, first and second electrodes Vp1 and Vp2 disposed in the first to sixteenth pixel regions SP1 to SP16, and first to thirty-second TFTs T1 to T32 disposed in the first to sixteenth pixel regions SP1 to SP16.

Here, pixel regions SP in four rows may be disposed to have a first connection A, and pixel regions SP in next four rows may be disposed to have a second connection B. That is, an arrangement relationship may vary for each four rows.

For example, pixel regions SP in first to fourth rows may have the first connection A, and pixel regions SP in fifth to eighth rows may have the second connection B.

Figure 9B:
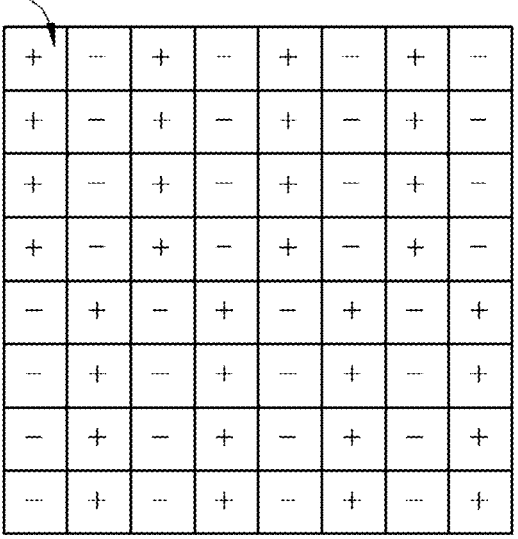

As illustrated in FIG. 9B, the data driver 196 (in FIG. 3) is output through this connection by column inversion, but the liquid crystal panel 180 (in FIG. 3) may be implemented in a form of vertical four dot inversion.

In the description of the modification examples, the vertical two dot inversion and the vertical four dot inversion are described as examples, but the present disclosure is not limited thereto. The data driver 196 (in FIG. 3) is output by column inversion, but the liquid crystal panel 180 (in FIG. 3) may be implemented in various forms of inversion through the first connection A and the second connection B of the present disclosure.

Therefore, high-voltage driving may be performed, and at the same time, heat generation of the data driver may be prevented and a flicker phenomenon may be effectively improved.

In the present disclosure, a TFT is connected to each of a first electrode and a second electrode in one pixel region, and a transmittance ratio of an LCD device can be improved by using two times a driving voltage using a voltage difference between the first electrode and the second electrode.

Further, since the LCD device has a structure in which a data voltage applied to first electrodes and second electrodes in odd-numbered rows can be applied to first electrodes and second electrodes in even-numbered rows so as to cross, the LCD device can be driven by a column inversion method in a form of dot inversion. Accordingly, heat of a driving circuit, which is generated when an LCD device is implemented by a dot inversion method, can be prevented.

Further, since a voltage is output from the driving circuit in the form of column inversion, power consumption can be reduced, and since a liquid crystal panel is driven in the form of dot inversion, a flicker phenomenon can be effectively improved.

It will be apparent to those skilled in the art that various modifications and variations can be made in the liquid crystal display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A liquid crystal display (LCD) device, comprising:
    first to fourth gate lines sequentially spaced apart from each other in parallel;
    first and second data lines configured to intersect the first to fourth gate lines and define a first pixel region and a second pixel region;
    a first electrode and a second electrode included in each of the first pixel region and the second pixel region;
    a first thin film transistor (TFT) connected to the second gate line and the first data line and configured to supply a first data voltage to the first electrode in the first pixel region;
    a second TFT connected to the second gate line and the second data line and configured to supply a second data voltage having a level opposite the first data voltage to the second electrode in the first pixel region;
    a third TFT connected to the fourth gate line and the first data line and configured to supply the first data voltage to the second electrode in the second pixel region;
    a fourth TFT connected to the fourth gate line and the second data line and configured to supply the second data voltage to the first electrode in the second pixel region;
    a third data line configured to intersect the first to fourth gate lines and define a third pixel region and a fourth pixel region;
    a first electrode and a second electrode included in each of the third pixel region and the fourth pixel region;
    a fifth TFT connected to the first gate line and the second data line and configured to supply the second data voltage to the first electrode in the third pixel region;
    a sixth TFT connected to the first gate line and the third data line and configured to supply a third data voltage having a level opposite the second data voltage to the second electrode in the third pixel region;
    a seventh TFT connected to the third gate line and the second data line and configured to supply the second data voltage to the second electrode in the fourth pixel region; and
    an eighth TFT connected to the third gate line and the third data line and configured to supply the third data voltage to the first electrode in the fourth pixel region,
    wherein the first pixel region, including the first TFT and the second TFT, and the third pixel region, including the fifth TFT and the sixth TFT, are in a first pixel row,
    wherein the second pixel region, including the third TFT and the fourth TFT, and the fourth pixel region, including the seventh TFT and the eighth TFT, are in a second pixel row,
    wherein each of the first through fourth pixel regions is configured to display a respective pixel output,
    wherein each of the first to eighth TFTs includes a gate electrode, and a source electrode and a drain electrode which are spaced apart from each other and formed above the gate electrode,
    wherein each of the drain electrodes of the first to eighth TFTs is connected to the corresponding first electrode or second electrode,
    wherein the drain electrodes of the first to eighth TFTs include first to third drain electrodes,
    wherein each of the first to third drain electrodes includes an extending portion and a connecting portion which contacts the corresponding first electrode or second electrode,
    wherein the extending portion of the first drain electrode has a first width and a first length and the connecting portion thereof has a first area,
    wherein the extending portion of the second drain electrode has the first width and a second length greater than the first length and the connecting portion thereof has a second area smaller than the first area,
    wherein the extending portion of the third drain electrode has the first width and the first length and the connecting portion thereof has a third area greater than the second area and has a shape different from the connecting portion of the first drain electrode,
    wherein areas of portions including the extending portions and the connecting portions of the first to third drain electrodes are the same,
    wherein each of the drain electrodes of the first and second TFTs is the first drain electrode and is connected to each of the first electrode and the second electrode in the first pixel region, and
    wherein the drain electrode of the third TFT is the second drain electrode and is connected to the second electrode in the second pixel region, and the drain electrode of the fourth TFT is the third drain electrode and is connected to the first electrode in the second pixel region.

2. The LCD device of claim 1, further comprising a gate driver configured to output a turn-on voltage to the first to fourth gate lines,
    wherein the gate driver sequentially outputs the turn-on voltage to the first to fourth gate lines.

3. The LCD device of claim 2, further comprising a data driver configured to output a data voltage to the data lines by a column inversion method.

4. The LCD device of claim 3, wherein the data driver outputs the data voltage whose polarity is inverted to the data lines adjacent to each other.

5. The LCD device of claim 4, wherein the first and second electrodes are symmetrically bent with respect to a center line of each of the pixel regions in a plan view.

6. The LCD device of claim 5, further comprising:
    a substrate disposed below the first electrode and the second electrode; and
    a nanocapsule liquid crystal layer disposed above the first electrode and the second electrode.

7. The LCD device of claim 6, wherein the nanocapsule liquid crystal layer is formed in a film form.

8. The LCD device of claim 7, further comprising first and second polarizers respectively disposed below the substrate and above the nanocapsule liquid crystal layer and having polarization axes orthogonal to each other.

9. The LCD device of claim 1, further comprising:
a substrate disposed below the first electrode and the second electrode; and
a nanocapsule liquid crystal layer disposed above the first electrode and the second electrode.

10. The LCD device of claim 9, wherein the nanocapsule liquid crystal layer is formed in a film form.

11. The LCD device of claim 10, further comprising first and second polarizers respectively disposed below the substrate and above the nanocapsule liquid crystal layer and having polarization axes orthogonal to each other.

12. The LCD device of claim 1, wherein each of the drain electrodes of the fifth and sixth TFTs is the first drain electrode and is connected to each of the first electrode and the second electrode in the third pixel region, and
wherein the drain electrode of the seventh TFT is the second drain electrode and is connected to the second electrode in the fourth pixel region, and the drain electrode of the eighth TFT is the third drain electrode and is connected to the first electrode in the fourth pixel region.

13. The LCD device of claim 1, further comprising:
a first storage capacitor and a second storage capacitor included in the first pixel region and respectively connected to the first TFT and the second TFT;
a third storage capacitor and a fourth storage capacitor in the second pixel region and respectively connected to the third TFT and the fourth TFT;
a fifth storage capacitor and a sixth storage capacitor in the third pixel region and respectively connected to the fifth TFT and the sixth TFT;
a seventh storage capacitor and an eighth storage capacitor in the fourth pixel region and respectively connected to the seventh TFT and the eighth TFT;
a first common line extending parallel to the first gate line and connected to the fifth and sixth storage capacitors;
a second common line extending parallel to the second gate line and connected to the first and second storage capacitors;
a third common line extending parallel to the third gate line and connected to the seventh and eighth storage capacitors; and
a fourth common line extending parallel to the fourth gate line and connected to the third and fourth storage capacitors,
wherein the first and second common lines are in the first pixel row, and are spaced apart from each other in parallel, and
wherein the third and fourth common lines are in the second pixel row, and are spaced apart from each other in parallel.

14. The LCD device of claim 13, wherein:
each of the first and second storage capacitors is defined as a region in which each of the drain electrodes of the first and second TFTs overlaps the second common line,
each of the fifth and sixth storage capacitors is defined as a region in which each of the drain electrodes of the fifth and sixth TFTs overlaps the first common line,
each of the third and fourth storage capacitors is defined as a region in which each of the drain electrodes of the third and fourth TFTs overlaps the fourth common line, and
each of the seventh and eighth storage capacitors is defined as a region in which each of the drain electrodes of the seventh and eighth TFTs overlaps the third common line.

15. The LCD device of claim 13, wherein the first and second common lines are between the first and second gate lines, and
wherein the third and fourth common lines are between the third and fourth gate lines.

* * * * *